US 8,086,417 B2
Dec. 27, 2011

(12) United States Patent
Seguine

(54) NORMALIZING CAPACITIVE SENSOR ARRAY SIGNALS

(75) Inventor: Ryan D. Seguine, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 270 days.

(21) Appl. No.: 12/167,552

(22) Filed: Jul. 3, 2008

(65) Prior Publication Data

US 2009/0009194 A1 Jan. 8, 2009

Related U.S. Application Data

(60) Provisional application No. 60/947,903, filed on Jul. 3, 2007.

(51) Int. Cl.
*G01R 27/26* (2006.01)

(52) U.S. Cl. ........ 702/105; 324/662; 324/684; 345/174; 345/156; 341/33

(58) Field of Classification Search ................ 702/105, 702/150, 158; 324/662, 664, 686, 684; 345/174, 345/173, 168, 157, 156, 176, 177, 178; 178/18.06, 178/18.07, 19.03, 18.01; 341/33, 10, 34; 200/600

See application file for complete search history.

(56) References Cited

U.S. PATENT DOCUMENTS

| | | | |
|---|---|---|---|
| 4,266,144 A | 5/1981 | Bristol | |
| 4,283,713 A | 8/1981 | Philipp | |
| 4,438,404 A | 3/1984 | Philipp | |
| 4,475,151 A | 10/1984 | Philipp | |
| 4,497,575 A | 2/1985 | Philipp | |
| 4,736,097 A | 4/1988 | Philipp | |
| 4,736,191 A | 4/1988 | Matzke et al. | |
| 4,773,024 A | 9/1988 | Faggin et al. | |
| 4,802,103 A | 1/1989 | Faggin et al. | |
| 4,831,325 A | 5/1989 | Watson, Jr. | |
| 4,876,534 A | 10/1989 | Mead et al. | |
| 4,879,461 A | 11/1989 | Philipp | |
| 4,935,702 A | 6/1990 | Mead et al. | |
| 4,953,928 A | 9/1990 | Anderson et al. | |
| 4,962,342 A | 10/1990 | Mead et al. | |
| 5,049,758 A | 9/1991 | Mead et al. | |
| 5,055,827 A | 10/1991 | Philipp | |
| 5,059,920 A | 10/1991 | Anderson et al. | |
| 5,068,622 A | 11/1991 | Mead et al. | |
| 5,073,759 A | 12/1991 | Mead et al. | |
| 5,083,044 A | 1/1992 | Mead et al. | |
| 5,095,284 A | 3/1992 | Mead | |
| 5,097,305 A | 3/1992 | Mead et al. | |
| 5,107,149 A | 4/1992 | Platt et al. | |
| 5,109,261 A | 4/1992 | Mead et al. | |
| 5,119,038 A | 6/1992 | Anderson et al. | |

(Continued)

OTHER PUBLICATIONS

International Search Report, dated Oct. 2, 2008, entire document.

(Continued)

*Primary Examiner* — Carol S Tsai

(57) ABSTRACT

An embodiment of the present invention is directed to a method for processing a position signal. The method includes receiving a first position signal from a capacitive sensor and determining a proximity of the capacitive sensor to a connection of an array of capacitive sensors. The sensitivity of the capacitive sensor is then adjusted and a second position signal is received from the capacitive sensor. The second position signal may then be reported. The present invention facilitates more accurate readings from an array of capacitive sensors.

21 Claims, 10 Drawing Sheets

U.S. PATENT DOCUMENTS

| | | | |
|---|---|---|---|
| 5,120,996 A | 6/1992 | Mead et al. | |
| 5,122,800 A | 6/1992 | Philipp | |
| 5,126,685 A | 6/1992 | Platt et al. | |
| 5,146,106 A | 9/1992 | Anderson et al. | |
| 5,160,899 A | 11/1992 | Anderson et al. | |
| 5,166,562 A | 11/1992 | Allen et al. | |
| 5,204,549 A | 4/1993 | Platt et al. | |
| 5,243,554 A | 9/1993 | Allen et al. | |
| 5,248,873 A | 9/1993 | Allen et al. | |
| 5,260,592 A | 11/1993 | Mead et al. | |
| 5,270,963 A | 12/1993 | Allen et al. | |
| 5,276,407 A | 1/1994 | Mead et al. | |
| 5,289,023 A | 2/1994 | Mead | |
| 5,303,329 A | 4/1994 | Mead et al. | |
| 5,305,017 A | 4/1994 | Gerpheide | |
| 5,324,958 A | 6/1994 | Mead et al. | |
| 5,331,215 A | 7/1994 | Allen et al. | |
| 5,336,936 A | 8/1994 | Allen et al. | |
| 5,339,213 A | 8/1994 | O'Callaghan | |
| 5,349,303 A | 9/1994 | Gerpheide | |
| 5,374,787 A * | 12/1994 | Miller et al. | 178/18.06 |
| 5,381,515 A | 1/1995 | Platt et al. | |
| 5,384,467 A | 1/1995 | Plimon et al. | |
| 5,408,194 A | 4/1995 | Steinbach et al. | |
| 5,488,204 A | 1/1996 | Mead et al. | |
| 5,495,077 A | 2/1996 | Miller et al. | |
| 5,541,878 A | 7/1996 | LeMoncheck et al. | |
| 5,543,588 A | 8/1996 | Bisset et al. | |
| 5,543,590 A | 8/1996 | Gillespie et al. | |
| 5,543,591 A | 8/1996 | Gillespie et al. | |
| 5,555,907 A | 9/1996 | Philipp | |
| 5,565,658 A | 10/1996 | Gerpheide et al. | |
| 5,566,702 A | 10/1996 | Philipp | |
| 5,629,891 A | 5/1997 | LeMoncheck et al. | |
| 5,646,377 A | 7/1997 | Oda | |
| 5,648,642 A | 7/1997 | Miller et al. | |
| 5,670,915 A | 9/1997 | Cooper et al. | |
| 5,682,032 A | 10/1997 | Philipp | |
| 5,730,165 A | 3/1998 | Philipp | |
| 5,757,368 A | 5/1998 | Gerpheide et al. | |
| 5,763,909 A | 6/1998 | Mead et al. | |
| 5,767,457 A | 6/1998 | Gerpheide et al. | |
| 5,796,183 A | 8/1998 | Hourmand | |
| 5,812,698 A | 9/1998 | Platt et al. | |
| 5,841,078 A | 11/1998 | Miller et al. | |
| 5,844,265 A | 12/1998 | Mead et al. | |
| 5,854,625 A | 12/1998 | Frisch et al. | |
| 5,861,583 A | 1/1999 | Schediwy et al. | |
| 5,861,875 A | 1/1999 | Gerpheide | |
| 5,864,242 A | 1/1999 | Allen et al. | |
| 5,864,392 A | 1/1999 | Winklhofer et al. | |
| 5,880,411 A | 3/1999 | Gillespie et al. | |
| 5,889,236 A | 3/1999 | Gillespie et al. | |
| 5,914,465 A | 6/1999 | Allen et al. | |
| 5,914,708 A | 6/1999 | LaGrange et al. | |
| 5,920,310 A | 7/1999 | Faggin et al. | |
| 5,926,566 A | 7/1999 | Wang et al. | |
| 5,942,733 A | 8/1999 | Allen et al. | |
| 5,943,052 A | 8/1999 | Allen et al. | |
| 5,969,513 A | 10/1999 | Clark | |
| 6,023,422 A | 2/2000 | Allen et al. | |
| 6,028,271 A | 2/2000 | Gillespie et al. | |
| 6,028,959 A | 2/2000 | Wang et al. | |
| 6,097,432 A | 8/2000 | Mead et al. | |
| 6,148,104 A | 11/2000 | Wang et al. | |
| 6,185,450 B1 | 2/2001 | Seguine et al. | |
| 6,188,228 B1 | 2/2001 | Philipp | |
| 6,188,391 B1 | 2/2001 | Seely et al. | |
| 6,222,528 B1 | 4/2001 | Gerpheide et al. | |
| 6,239,389 B1 * | 5/2001 | Allen et al. | 178/18.01 |
| 6,249,447 B1 | 6/2001 | Boylan et al. | |
| 6,262,717 B1 | 7/2001 | Donohue et al. | |
| 6,280,391 B1 | 8/2001 | Olson et al. | |
| 6,288,707 B1 * | 9/2001 | Philipp | 345/168 |
| 6,304,014 B1 | 10/2001 | England et al. | |
| 6,320,184 B1 | 11/2001 | Winklhofer et al. | |
| 6,323,846 B1 | 11/2001 | Westerman et al. | |
| 6,326,859 B1 | 12/2001 | Goldman et al. | |
| 6,377,009 B1 | 4/2002 | Philipp | |
| 6,380,929 B1 | 4/2002 | Platt | |
| 6,380,931 B1 * | 4/2002 | Gillespie et al. | 345/173 |
| 6,414,671 B1 * | 7/2002 | Gillespie et al. | 345/157 |
| 6,430,305 B1 | 8/2002 | Decker | |
| 6,441,073 B1 | 8/2002 | Tanaka et al. | |
| 6,448,911 B1 | 9/2002 | Somayajula | |
| 6,452,514 B1 * | 9/2002 | Philipp | 341/33 |
| 6,457,355 B1 | 10/2002 | Philipp | |
| 6,466,036 B1 | 10/2002 | Philipp | |
| 6,473,069 B1 | 10/2002 | Gerpheide | |
| 6,489,899 B1 | 12/2002 | Ely et al. | |
| 6,498,720 B2 | 12/2002 | Glad | |
| 6,499,359 B1 | 12/2002 | Washeleski et al. | |
| 6,522,128 B1 | 2/2003 | Ely et al. | |
| 6,523,416 B2 | 2/2003 | Takagi et al. | |
| 6,534,970 B1 | 3/2003 | Ely et al. | |
| 6,535,200 B2 * | 3/2003 | Philipp | 345/168 |
| 6,570,557 B1 | 5/2003 | Westerman et al. | |
| 6,583,632 B2 | 6/2003 | Von Basse et al. | |
| 6,587,093 B1 | 7/2003 | Shaw et al. | |
| 6,610,936 B2 * | 8/2003 | Gillespie et al. | 178/18.01 |
| 6,624,640 B2 | 9/2003 | Lund et al. | |
| 6,639,586 B2 | 10/2003 | Gerpheide | |
| 6,642,857 B1 | 11/2003 | Schediwy et al. | |
| 6,649,924 B1 | 11/2003 | Philipp et al. | |
| 6,667,740 B2 | 12/2003 | Ely et al. | |
| 6,673,308 B2 | 1/2004 | Hino et al. | |
| 6,677,932 B1 | 1/2004 | Westerman | |
| 6,680,731 B2 | 1/2004 | Gerpheide et al. | |
| 6,683,462 B2 | 1/2004 | Shimizu | |
| 6,705,511 B1 | 3/2004 | Dames et al. | |
| 6,714,817 B2 | 3/2004 | Daynes et al. | |
| 6,730,863 B1 | 5/2004 | Gerpheide | |
| 6,750,852 B2 * | 6/2004 | Gillespie et al. | 345/173 |
| 6,774,644 B2 | 8/2004 | Eberlein | |
| 6,781,577 B2 | 8/2004 | Shigetaka | |
| 6,788,221 B1 | 9/2004 | Ely et al. | |
| 6,788,521 B2 | 9/2004 | Nishi | |
| 6,798,218 B2 | 9/2004 | Kasperkovitz | |
| 6,809,275 B1 | 10/2004 | Cheng et al. | |
| 6,856,433 B2 | 2/2005 | Hatano et al. | |
| 6,873,203 B1 | 3/2005 | Latham, II et al. | |
| 6,888,538 B2 | 5/2005 | Ely et al. | |
| 6,893,724 B2 | 5/2005 | Lin et al. | |
| 6,903,402 B2 | 6/2005 | Miyazawa | |
| 6,904,570 B2 | 6/2005 | Foote et al. | |
| 6,949,811 B2 | 9/2005 | Miyazawa | |
| 6,969,978 B2 | 11/2005 | Dening | |
| 6,970,160 B2 | 11/2005 | Mulligan et al. | |
| 6,975,123 B1 | 12/2005 | Malang et al. | |
| 7,006,078 B2 | 2/2006 | Kim | |
| 7,030,782 B2 | 4/2006 | Ely et al. | |
| 7,030,860 B1 | 4/2006 | Hsu et al. | |
| 7,046,230 B2 | 5/2006 | Zadesky et al. | |
| 7,068,039 B2 | 6/2006 | Parker | |
| 7,075,316 B2 | 7/2006 | Umeda et al. | |
| 7,109,978 B2 * | 9/2006 | Gillespie et al. | 345/173 |
| 7,119,550 B2 | 10/2006 | Kitano et al. | |
| 7,133,140 B2 | 11/2006 | Lukacs et al. | |
| 7,133,793 B2 | 11/2006 | Ely et al. | |
| 7,141,968 B2 | 11/2006 | Hibbs et al. | |
| 7,141,987 B2 | 11/2006 | Hibbs et al. | |
| 7,148,704 B2 * | 12/2006 | Philipp | 324/686 |
| 7,151,528 B2 | 12/2006 | Taylor et al. | |
| 7,212,189 B2 | 5/2007 | Shaw et al | |
| 7,239,302 B2 | 7/2007 | Kim | |
| 7,288,977 B2 | 10/2007 | Stanley | |
| 7,298,124 B2 | 11/2007 | Kan et al. | |
| 7,307,485 B1 | 12/2007 | Snyder et al. | |
| 7,375,535 B1 | 5/2008 | Kutz et al. | |
| 7,400,318 B2 * | 7/2008 | Gerpheide et al. | 345/173 |
| 7,423,635 B2 | 9/2008 | Taylor et al. | |
| 7,429,976 B2 * | 9/2008 | Harley et al. | 345/157 |
| 7,466,307 B2 | 12/2008 | Trent, Jr. et al. | |
| 7,492,358 B2 * | 2/2009 | Chi et al. | 345/173 |
| 7,663,607 B2 | 2/2010 | Hotelling et al. | |
| 7,701,440 B2 * | 4/2010 | Harley | 345/157 |
| 7,728,377 B2 | 6/2010 | Elsass et al. | |

| | | | |
|---|---|---|---|
| 2002/0063688 | A1 | 5/2002 | Shaw et al. |
| 2002/0191029 | A1 | 12/2002 | Gillespie et al. |
| 2003/0062889 | A1 | 4/2003 | Ely et al. |
| 2003/0080755 | A1 | 5/2003 | Kobayashi |
| 2003/0091220 | A1 | 5/2003 | Sato et al. |
| 2005/0024341 | A1 | 2/2005 | Gillespie et al. |
| 2005/0031175 | A1 | 2/2005 | Hara et al. |
| 2006/0032680 | A1 | 2/2006 | Elias et al. |
| 2006/0273804 | A1 | 12/2006 | Delorme et al. |
| 2007/0024970 | A1 | 2/2007 | Lub et al. |
| 2007/0229469 | A1 | 10/2007 | Seguine |
| 2007/0229470 | A1 | 10/2007 | Snyder et al. |

OTHER PUBLICATIONS

Written Opinion of the International Searching Authority, dated Oct. 2, 2008, entire document.
USPTO Notice of Allowance for U.S. Appl. No. 11/273,708 dated Aug. 9, 2007; 4 pages.
USPTO Final Rejection for U.S. Appl. No. 11/273,708 dated Jul. 5, 2007; 8 pages.
USPTO Non-Final Rejection for U.S. Appl. No. 11/273,708 dated Mar. 19, 2007; 16 pages.
USPTO Notice of Allowance for U.S. Appl. No. 11/230,719 dated Jan. 16, 2008; 4 pages.
USPTO Advisory Action for U.S. Appl. No. 11/230,719 dated Nov. 30, 2007; 3 pages.
USPTO Final Rejection for U.S. Appl. No. 11/230,719 dated Sep. 7, 2007; 9 pages.
USPTO Non-Final Rejection for U.S. Appl. No. 11/230,719 dated May 25, 2007; 6 pages.
USPTO Non-Final Rejection for U.S. Appl. No. 11/230,719 dated Jan. 16, 2007; 8 pages.
USPTO Non-Final Rejection for U.S. Appl. No. 11/230,719 dated Aug. 28, 2006; 7 pages.
USPTO Non-Final Rejection for U.S. Appl. No. 11/230,719 dated May 11, 2006; 5 pages.
USPTO Final Rejection for U.S. Appl. No. 11/605,819 dated Feb. 2, 2010; 15 pages.
USPTO Non-Final Rejection for U.S. Appl. No. 11/605,819 dated Aug. 11, 2009; 12 pages.
USPTO Final Rejection for U.S. Appl. No. 11/605,506 dated Dec. 21, 2010; 14 pages.
USPTO Advisory Action for U.S. Appl. No. 11/605,506 dated Apr. 12, 2010; 3 pages.
USPTO Final Rejection for U.S. Appl. No. 11/605,506 dated Feb. 3, 2010; 14 pages.
USPTO Non-Final Rejection for U.S. Appl. No. 11/605,506 dated Aug. 11, 2009; 11 pages.
Seguine, Dennis. "Capacitive Switch Scan," Cypress Semiconductor Application Note, Apr. 14, 2005.
Seguine, Ryan. "Layout Guidelines for PSoCTM CapSenseTM," Cypress Semiconductor Application Note, Jul. 22, 2005.
Cypress Semiconductor Corporation, "Cypress Introduces PSoC(TM)-Based CApacitive Touch Sensor Solution", Cypress Press Release, May 31, 2005, http://www.cypress.com/portal/server.pt?space=CommunityPage&control=SetCommunity&CommunityID=208&PageID=218&DirectoryID=661552 (Retrieved on Feb. 5, 2007).
Lee, Mark, "EMC Design condsiderations for PsoCTM CapSenseTM Applications," Cypress Semiconductor Corporation, Application Note AN2318, pp. 1-6, Sep. 16, 2005.
Cypress Semiconductor Corporation, "Release Notes sm017," pp. 1-3, Jan. 24, 2007.
Cypress Semiconductor Corporation, "PSoCR CY8C20x34 Technical Reference Manual (TRM)," PSoC CY8C20x34 TRM, Version 1.0, pp. 1-218, 2006.
Sedra, Adel S. et al., "Microelectronic Circuits," 3rd Edition, Oxford University Press, pp. xiii-xx and 861-883, 1991.
Van Ess, David, "Simulating a 55 timer with PSoCTM," Cypress Semiconductor Corporation, Application Note AN2286, pp. 1-10, May 19, 2005.
Cypress semiconductor Corporation, "FAN Controller CG6457AM and CG6462AM," PSoCTM Mixed-Signal Array Preliminary Data sheet, pp. 1-25, May 24, 2005.
Cypress Semiconductor Corporation, "PsoC Mixed-Signal controllers," Product Description, pp. 1-2, http://www.cypress.com/portal/server.pt?space=CommunityPage&control=SetCommunity&CommunityID=209&PageID=215&gid=13&fid=24&category=false. (Sep. 27, 2005).
Cypress Semiconductor Corporation, "CY8C21x34 Data Sheet," CSR User Module, CSR V.1.0, Oct. 6, 2005, pp. 1-36.
Chapweske, Adam, "The PS/2 Mouse Interface," PS/2 Mouse Interfacing, 2001.

* cited by examiner

700

NORMALIZING CAPACITIVE SENSOR ARRAY SIGNALS

RELATED U.S. APPLICATIONS

This application claims the benefit of and priority to copending provisional patent application, Ser. No. 60/947,903, entitled "Method For Normalizing Signal From A High-Impedance Array of Capacitive Sensors," with filing date Jul. 3, 2007, and hereby incorporated by reference in its entirety.

FIELD OF INVENTION

Embodiments of the present invention generally relate to capacitive sensor arrays.

BACKGROUND OF THE INVENTION

As computing technology has developed, user interface devices have advanced correspondingly. User interfaces have become increasingly significant in the usability of a computing device.

One particular user interface becoming increasingly popular is touch screen or track pad which uses an array of capacitive sensors using high impedance capacitance substrates. The sensor array is typically connected to detection logic via a portion of the sides of the array. The sensor array is divided up into rows and columns each with corresponding capacitive sensing elements. In order for a signal of a capacitive sensing element to be processed, the signal must travel though the rest of the row or column to be received by the detection logic. The greater the distance from the connection of the sensor array, the greater signal loss that occurs due to series impedance as the signal travels through the array to the detector logic. For example, for a sensor array having connections on the bottom and right, signals registered in the upper left corner will experience signal loss as the signals travel through the array connections. In contrast, signals registered at the bottom right of the array will have much less signal loss. The non-uniform signal loss characteristic may lead to inaccurate position determination across the face of the user interface panel. For an array of high impedance row and column sensors, the reduction in sensitivity occurs worse at the corner that is furthest away from the detection logic connection.

Thus, conventional user interface designs have signal loss issues as signals from sensors remote from the connection of a sensory array are impacted by the series impedance of the sensor array.

SUMMARY OF THE INVENTION

Accordingly, embodiments of the present invention are directed to a system and method for processing position signal information using high impedance capacitive sensors. The processing of the signal information overcomes the signal loss caused by series impedance of an array of capacitive sensors. Embodiments of the present invention thus facilitate accurate reporting of position information from an array of capacitive sensors that utilize high impedance capacitive substrates.

More specifically, an embodiment of the present invention is directed to a method for processing a position signal. The method includes receiving a first position signal from a capacitive sensor and determining a proximity of the capacitive sensor to a connection of an array of capacitive sensors. The sensitivity of the capacitive sensor is then adjusted (e.g., by adjusting the scan time) and a second position signal (e.g., including a more sensitive sensor reading) is received from the capacitive sensor. The second position signal may then be reported.

Another embodiment of the present invention is directed to a system for processing position information using capacitive sensors. The system includes a position signal receiver for receiving a position signal from an array of capacitive sensors and a position information module for accessing information corresponding with the position signal. The information may include values to be applied to the position signal. The system further includes a sensor sensitivity control module for adjusting the sensitivity of a capacitive sensor (e.g., adjusting the scan time or applying a value corresponding to the location of a sensor) and a position signal reporting module for reporting the position signal to a coupled device (e.g., computing device).

Another embodiment of the present invention is a method for reporting position information using capacitive sensors. The method includes receiving position information from a capacitive sensor and accessing a value corresponding to the position information. The value accessed may correspond to the location of the capacitive sensor within an array of capacitive sensors. The method further includes adjusting the position information based on the value corresponding to the position information and reporting the adjusted position information.

Another embodiment of the present invention is a method for processing a position signal. The method includes receiving a first position signal from a plurality of active capacitive sensors and determining a proximity of the plurality of active capacitive sensors to a connection of an array of capacitive sensors. The method further includes adjusting the sensitivity of the active capacitive sensors and receiving a second position from the plurality of active capacitive sensors. The second position signal (e.g., more sensitive signal) may then be reported.

DESCRIPTION OF THE INVENTION

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Figure 1:
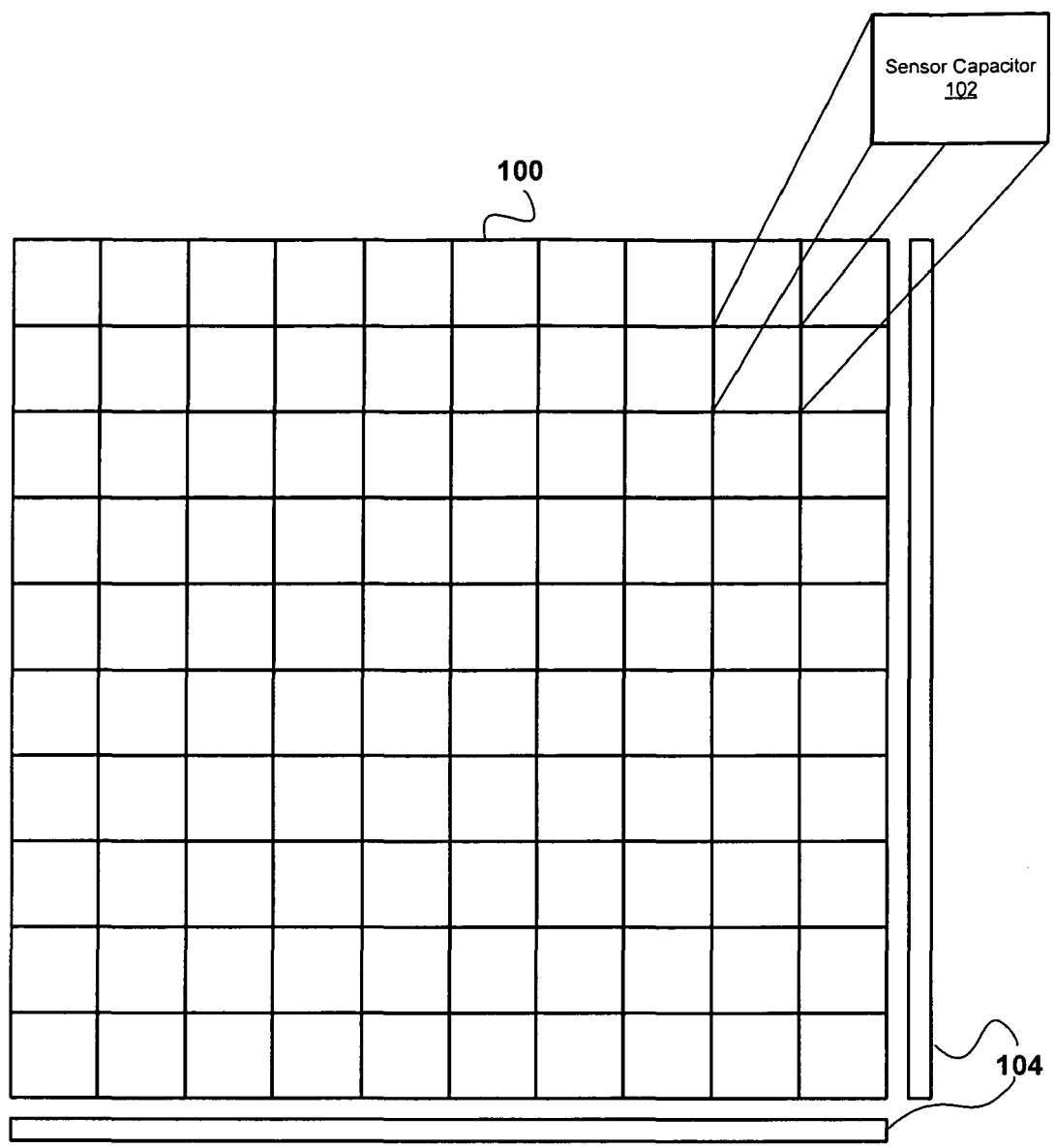
FIG. 1 shows block diagram of an exemplary capacitive sensor array, in accordance with one embodiment of the present invention

FIG. 1 shows block diagram of an exemplary capacitive sensor array, in accordance with one embodiment of the present invention. Capacitive sensor array 100 may provide a user interface (e.g., touchpad, track pad, touch screen, and the like) for a variety of devices including, but not limited to, servers, desktop computers, laptops, tablet PCs, mobile devices, music devices, video devices, cellular telephones, and smartphones etc. Capacitive sensor array 100 may include a plurality of sensor elements in a row and column configuration that utilize a high impedance capacitance substrate. Another possible structure for a capacitive sensing array is described in US Patent Application 2007/0229470.

Sensor capacitor 102 illustrates an exemplary capacitive sensor cell in capacitive sensor array 100. Capacitive sensor array 100 may be configured in a variety of ways including, but not limited to, a square, a rectangle, a circle, or a ring etc. Connections 104 facilitate coupling of capacitive sensor array 100 to detection logic for detecting and reporting a user contact and its position to a coupled device (e.g., computing device).

In one embodiment, capacitive sensor array 100 is made of a material having an impedance which impacts signals received from sensor circuits remote from connections 104. For example, signals from sensor circuits in the upper left of capacitive sensor array 100 may be reduced or impacted by series impedance as the signal travels through the array to connections 104. It is appreciated that as the distance between connections 104 and a sensor of capacitive sensor circuit array 100 increases, the impact of the series impedance of capacitive sensor array 100 increases. Embodiments of the present invention address this decrease in sensitivity to provide a more accurate position determination.

Example Circuits

FIGS. 2 and 4-6 illustrate example components used by various embodiments of the present invention. Although specific components are disclosed in circuits 200, 400, 500, and 600 it should be appreciated that such components are examples. That is, embodiments of the present invention are well suited to having various other components or variations of the components recited in systems 200, 400, 500, and 600. It is appreciated that the components in systems 200, 400, 500, and 600 may operate with other components than those presented, and that not all of the components of systems 200, 400, 500, and 600 may be required to achieve the goals of systems 200, 400, 500, and 600.

Figure 2:
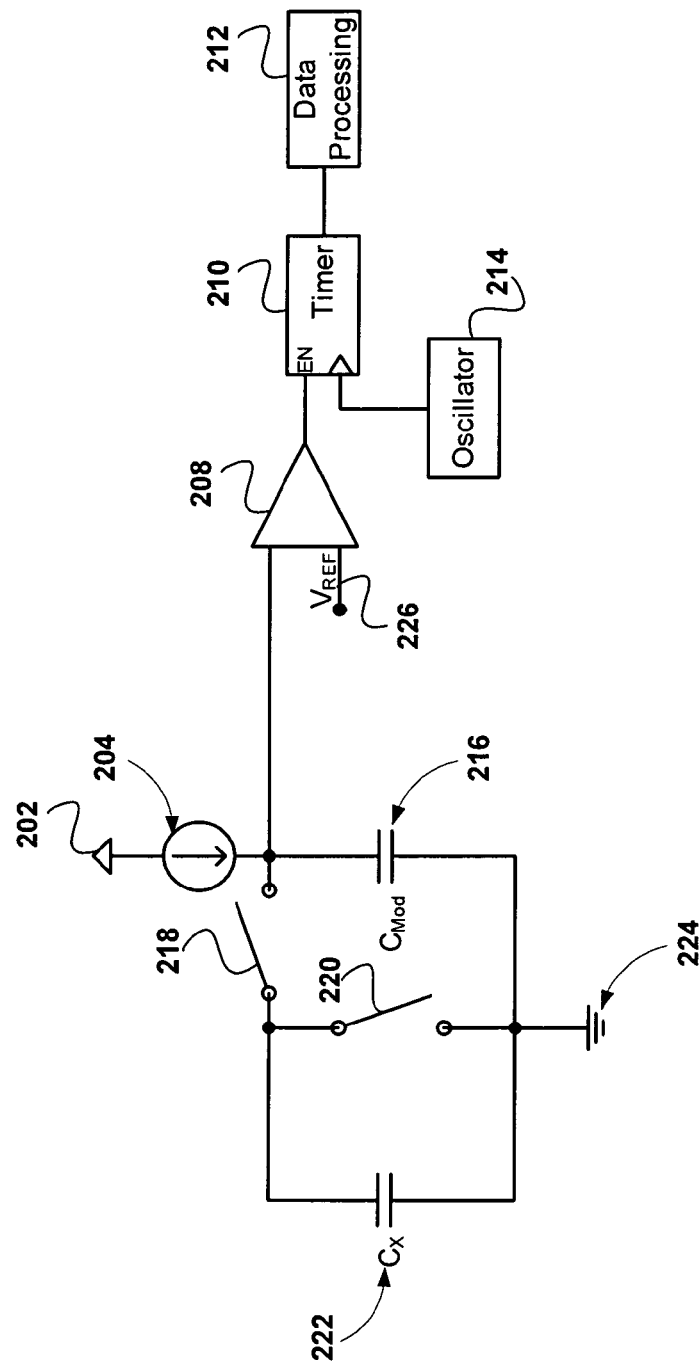
FIG. 2 shows an exemplary sensor circuit, in accordance with one embodiment of the present invention.

FIG. 2 shows an exemplary sensor circuit 200, in accordance with one embodiment of the present invention. Sensor circuit 200 includes Vdd signal 202, current source 204, comparator 208, timer 210, data processing module 212, oscillator 214, reference voltage 226, external modification capacitor 216, ground signal 224, sensor capacitor 222 (located in the sensor array), switch 220 and switch 218. Current source 204 may be a current DAC (Digital to Analog converter). Circuits of the type shown in FIG. 2 are described in more detail in U.S. Pat. Nos. 7,307,485 and 7,375,535.

In one embodiment, circuit 200 may operate in three phases. In a first phase (See 302, FIG. 3), switch 218 alternatively couples current source 204 to sensor capacitor 222 and current source 204 charges or settles external modification capacitor 216 to a start voltage, Vstart. In one embodiment, the start voltage may be governed the voltage current function expressed by:

$$V_{Start} = \frac{1}{f \cdot C_x} \cdot iDAC$$

Where f is the frequency of the switching of switch 218, Cx is the capacitance of the sensor capacitor 222, and iDAC is the current of current source 204.

It is appreciated that the capacitance of sensor capacitor 222 (one of the capacitors of array 100 of FIG. 1) varies with the presence of objects (e.g., a finger). For example, the presence of a finger may increase the capacitance and thereby result in a lower starting voltage. Conversely, a higher starting voltage may result from no finger being present.

In a second phase (See 304, FIG. 3), the sensor capacitor 222 is decoupled from current source 204 by switch 218 and sensor capacitor 222 is discharged by coupling to ground signal 224 via switch 220. External modification capacitor 216 may be charged by current source 204 until the voltage across it increases to reference voltage 226 at which time comparator 208 is tripped which disables timer 210. In one embodiment, voltage on the external modification capacitor 216 is reduced through a low pass filter in series with external modification capacitor 216 to the input of comparator 208.

In one embodiment, timer 210 is a counter (e.g., 16-bit). The raw number of counts on timer 210 measures the time required from Vstart to Vref (reference voltage 226) and may be used to determine if a finger is present on sensor capacitor 222. The raw counts are taken after each measurement sequence (e.g., after each charge of sensor capacitor 222 and tripping of comparator 208) and then compared to a stored baseline number of counts with no finger present on sensor capacitor 222. If the difference between the raw counts and the baseline counts exceeds a threshold, then sensor activation is detected for that sensor. The value of the counter may measure how long it took for the voltage across external modification capacitor 216 to reach the threshold or reference voltage 226 and can then be used to determine what the start voltage was which is a measure of whether or not a finger was present.

For example, when no finger is present, 100 cycles may be required to bring the voltage across external modification capacitor 216 to reference voltage 226. When a finger is present, 105 cycles may be required to bring the voltage across external modification capacitor 216 to reference voltage 226. If there is a threshold of three cycles to indicate the presence of an object, as long as the number of the change in cycles is greater than three, the sensor may be determined or considered to be active. It is appreciated that a difference threshold larger than zero prevents noise or other interference from appearing as an active sensor.

The time (or count) measured by timer 210 may be used by data processing module 212 to the detection logic to process the data and make decisions based on the capacitive inputs (e.g., sensors triggered by presence of a finger). Lower starting voltages (e.g., when a finger is present) lead to longer charge times as the current from the current source 204 flows into the external modification capacitor 216 and increases the voltage at the same rate. If the start voltage is low, the time or count measured by timer 210 will be relatively large because current source 204 will have to provide more charge to external modification capacitor 216 to reach reference voltage 226. If the start voltage is relatively high (e.g., no finger present), the time or count measured by time 210 is low as current source 204 provides less current to external modification capacitor 216 to reach reference voltage 226.

In a third phase (See 306, FIG. 3), the sensor scan is completed and current source 204 is turned off. During the third phase, the time or count from timer 210 may be processed and stored. Voltage on the external modification capacitor 216 decreases as charge dissipates by leakage currents until the next scan begins. In one embodiment, the amount of time that the voltage decreases is strictly dependent upon the firmware between each scan and the CPU (Central Processing Unit) clock speed. It is appreciated that the next scan may then start with the first phase on the same sensor circuit or another sensor circuit (e.g., an adjacent or active sensor circuit).

In another embodiment, comparator 208 may be replaced with an analog-to-digital converter (ADC). Charge from the sensor capacitor 222 is transferred to external modification capacitor 216 acting as a filter capacitor for a prescribed number of cycles. After the prescribed number of cycles is complete, the voltage on external modification capacitor 216 is measured by the ADC and the output of the ADC is proportional to the size of sensor capacitor 222. The measured value of the ADC may then be used to determine the presence of an object.

Figure 3:
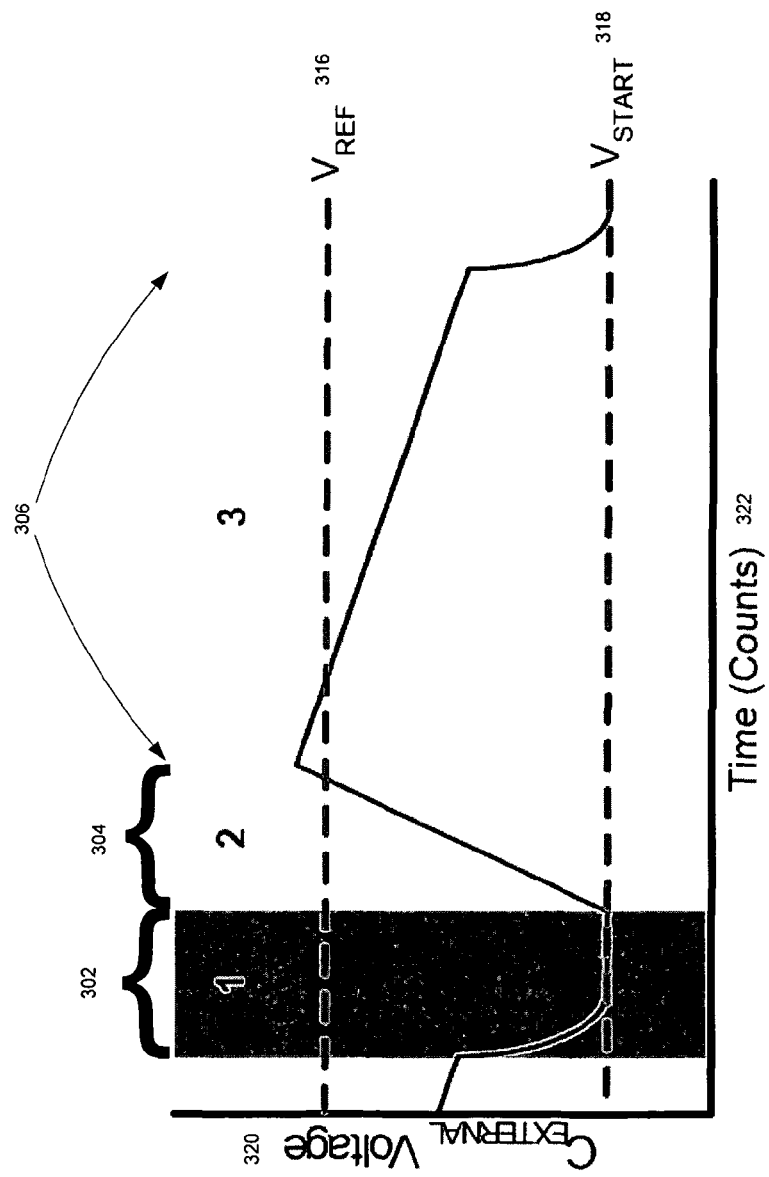
FIG. 3 shows an exemplary timing diagram or voltage graph of a capacitor of the exemplary sensor circuit of FIG. 2, in accordance with an embodiment of the present invention.

FIG. 3 shows an exemplary voltage graph of the exemplary sensor circuit of FIG. 2 in operation, in accordance with an embodiment of the present invention. Graph 300 includes vertical axis 320 corresponding to the voltage of external modification capacitor 216 and horizontal axis 322 corresponding to the time (or counts) which may be measured by timer 210. Graph 300 further includes voltage markers 316 corresponding to reference voltage 226 and voltage marker 318 corresponding to the start voltage.

As mentioned above, circuit 200 may operate in three phases. Graph 300 illustrates phase 1 with region 302 during which the voltage on external modification capacitor 216 is settled or brought to a start voltage.

Graph 300 illustrates phase 2 with region 304 during which external modification capacitor 216 is charged via current source 204 to reference voltage 226. The amount of time needed to reach reference voltage 226 is used by data processing module 212 to determine whether an object (e.g., finger) is present. It is appreciated that the voltage of external modification capacitor 216 may exceed reference voltage 226 before comparator 208 trips timer 210. To increase the sensitivity of this detection mechanism, the duration of 304 can be increased which will increase the resolution of the reading.

Graph 300 further illustrates phase 3 with region 306 during which external modification capacitor 216 is discharged. It is appreciated that external modification capacitor 216 may be discharged while other capacitive sensors of a capacitive sensor array are scanned.

Figure 4:
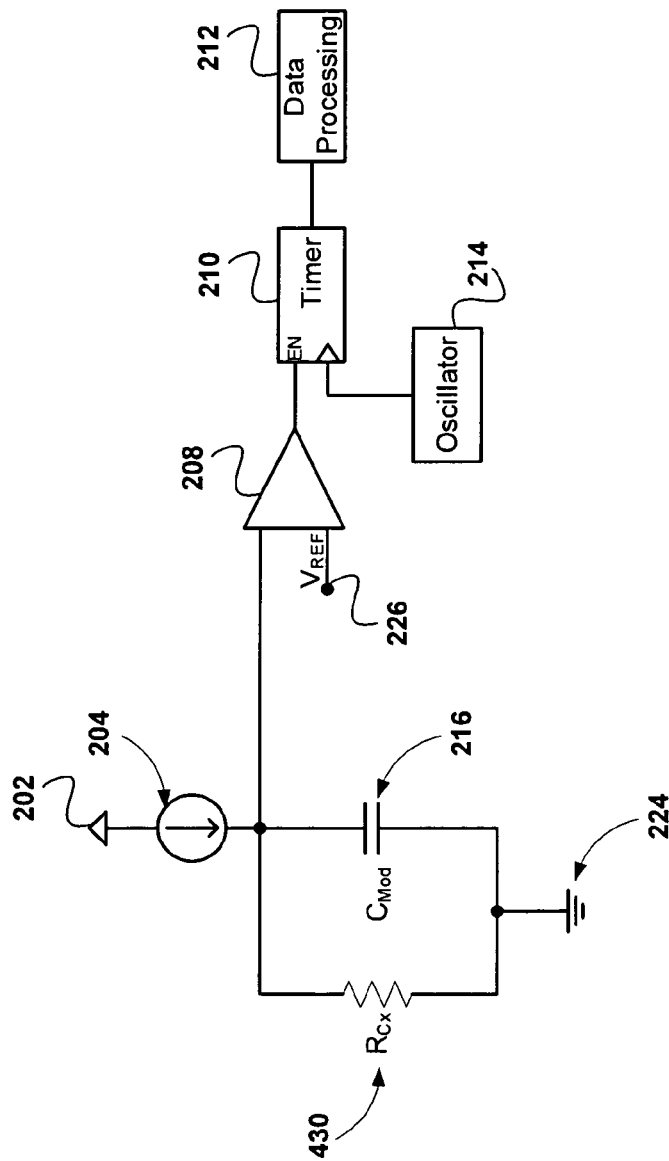
FIG. 4 shows the exemplary sensor circuit of FIG. 2 with an equivalent resistance during phase 1, in accordance with an embodiment of the present invention.

FIG. 4 shows an exemplary sensor circuit with an equivalent resistance, in accordance with phase 1 of the circuit of FIG. 2. Sensor circuit 400 includes Vdd signal 202, current source 204, comparator 208, timer 210, data processing 212, oscillator 214, reference voltage 226, external modification capacitor 216, ground signal 224, sensor capacitor 222, and equivalent resistance 430.

In the first phase, a current value for current source 204 may be determined which results in a start voltage across equivalent resistance 430 that is below reference voltage 226.

The equivalent resistance 430 may be governed the voltage current function expressed by:

$$R_{Equivalent} = \frac{1}{f_s \cdot C_x}$$

Where fs is the switching frequency of phases 1 and 2 as described herein, and Cx is the capacitance of sensor capacitor 222.

As shown, equivalent resistance 430 is inversely proportional to the capacitance of sensor capacitor 222. The presence of an object (e.g., finger) on a sensor therefore increases the capacitance of the sensor, which decreases equivalent resistance 430 formed by the switching phases 1 and 2. A decreased equivalent resistance results in a lower starting voltage by V=IR. In one embodiment, the start voltage may be governed the voltage current function expressed by:

$$V_{Start} = \frac{1}{f_s \cdot C_x} \cdot iDAC$$

Where fs is the switching frequency of phases 1 and 2 as described herein, and Cx is the capacitance of sensor capacitor 222 and iDAC is current of current source 204.

A lower starting voltage corresponds to an increased time for current source 204 to charge up external modification capacitor 216, thereby resulting in a larger time that timer 210 will operate. Data processing module 212 may thus process the increased value from timer 210 to indicate the presence of an object relative to the equivalent resistance 430.

Figure 5:
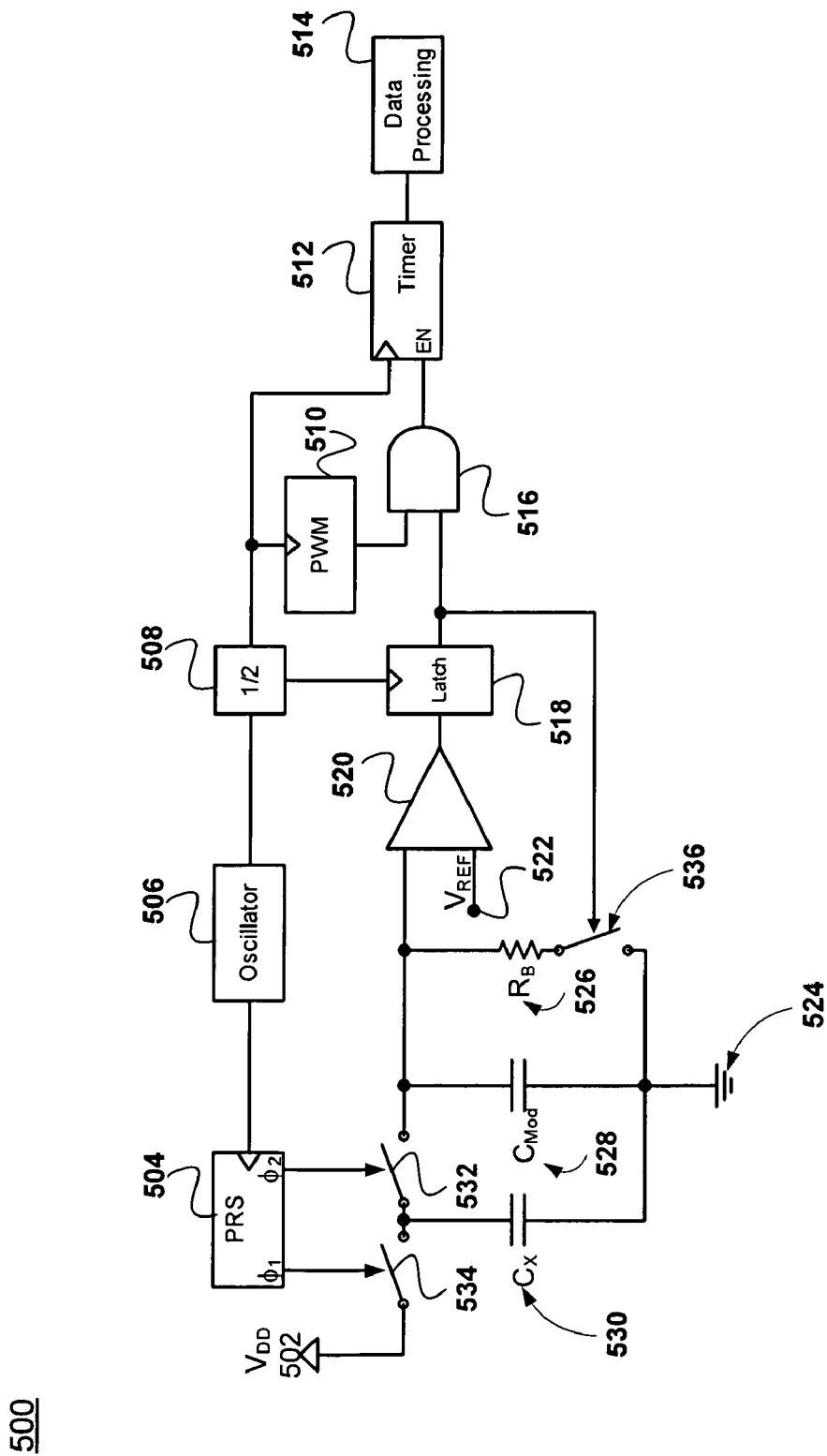
FIG. 5 shows another exemplary sensor circuit, in accordance with another embodiment of the present invention.

FIG. 5 shows an exemplary sensor circuit, in accordance with another embodiment of the present invention. Sensor circuit 500 includes Vdd 502, pseudo random generator 504, oscillator 506, frequency modifier 508, pulse-width modulator 510, counter 512, data processing module 514, and gate 516, latch 518, comparator 520, reference voltage 522, discharge resistor 526, ground signal 524, external modification capacitor 528, sensor capacitor 530, switch 532, switch 534, and switch 536.

Switches 532 and 534 are controlled by pseudo random generator 504, which modulates the voltage across external modification capacitor 528 about reference voltage 522 in charge up and charge down steps. Pseudo random generator 504 reduces the electromagnetic inference susceptibility and radiated emissions of capacitive sensing circuits. In one embodiment, external modification capacitor 528 is larger than sensor capacitor 530.

In one embodiment, switch 534 is used to charge sensor capacitor 530. The capacitance of sensor capacitor 530 varies with the presence of an object (e.g., a finger). After the charging of sensor capacitor 530, switch 534 is decoupled and switch 532 is coupled thereby allowing the charge of sensor capacitor 530 to flow to external modification capacitor 528.

As the charge in external modification capacitor 528 increases, so does the voltage across external modification capacitor 528. The voltage across external modification capacitor 528 may be an input to comparator 520. When the input to comparator 520 reaches the threshold voltage or reference voltage 522, discharge resistor 526 is connected and charge is bled off of external modification capacitor 528 at a rate determined by the starting voltage across the external modification capacitor 528 and the value of discharge resistor 526. As the voltage across external modification capacitor 528 decreases and the voltage passes reference voltage 522, discharge resistor 526 is disconnected from ground 524 via switch 536.

The charge/discharge cycle of the external modification capacitor 528 is manifested as a bit stream on the output of comparator 520. The bit-stream of comparator 520 is 'ANDed' with pulse-width modulator 510 via and gate 516 to enable timer 512. Pulse width modulator 510 sets the time-frame or measurement window in which the bit-stream enables and disables timer 512. The capacitance measurement and therefore the presence of an object is a matter of comparing the bit-stream of the comparator to the known, baseline value.

The value of reference voltage 522 affects the baseline level of counts or time measured by timer 512 from a sensor when no finger is on the sensor. This voltage on an external modification capacitor 528 may reach the reference voltage before comparator 520 trips, so the value of reference voltage 522 affects the amount of time that it takes external modification capacitor 528 to charge to reference voltage 522, decreasing the density of the bit-stream during a scan.

The output of timer 512 is used for processing the level of capacitance change and determining the sensor activation state. The duration of these steps is compared relative to each other by looking at the comparator bit-stream density. If the density of the bit-stream is relatively high, the sensor is read as "on". The bit-stream output of comparator 520 is synchronized with system clock via latch 518.

Figure 6:
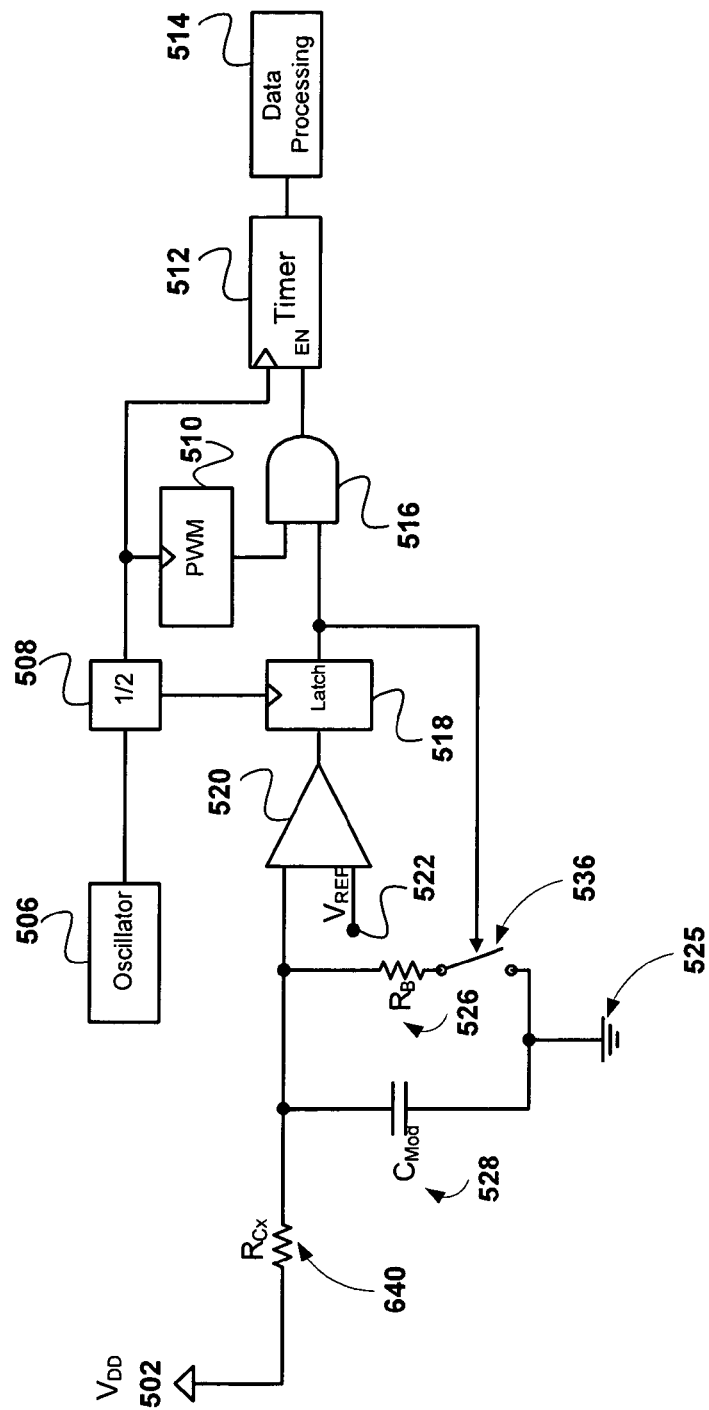
FIG. 6 shows the exemplary sensor circuit of FIG. 5 with an equivalent resistance, in accordance with an embodiment of the present invention.

FIG. 6 shows an equivalent resistance of the circuit of FIG. 5, in accordance with an embodiment of the present invention. Sensor circuit 600 includes Vdd 502, oscillator 506, frequency modifier 508, pulse-width modulator 510, counter 512, data processing module 514, and gate 516, latch 518, comparator 520, reference voltage 522, discharge resistor 526, ground signal 5247 external modification capacitor 528, switch 536, and equivalent resistance 640.

Sensor capacitor 530 is replaced with equivalent resistance 540. Equivalent resistance 640 is inversely proportional to the capacitance of sensor capacitor 530. As such, the presence of an object (e.g., a finger) will result in an increase in capacitance and a corresponding reduction in the resistance of equivalent resistance 640. The reduction of equivalent resistance 640 thereby allows more current to charge external modification capacitor 528 and thereby allowing the voltage across external modification capacitor 528 to reach reference voltage 522 relatively faster.

Example System

Figure 7:
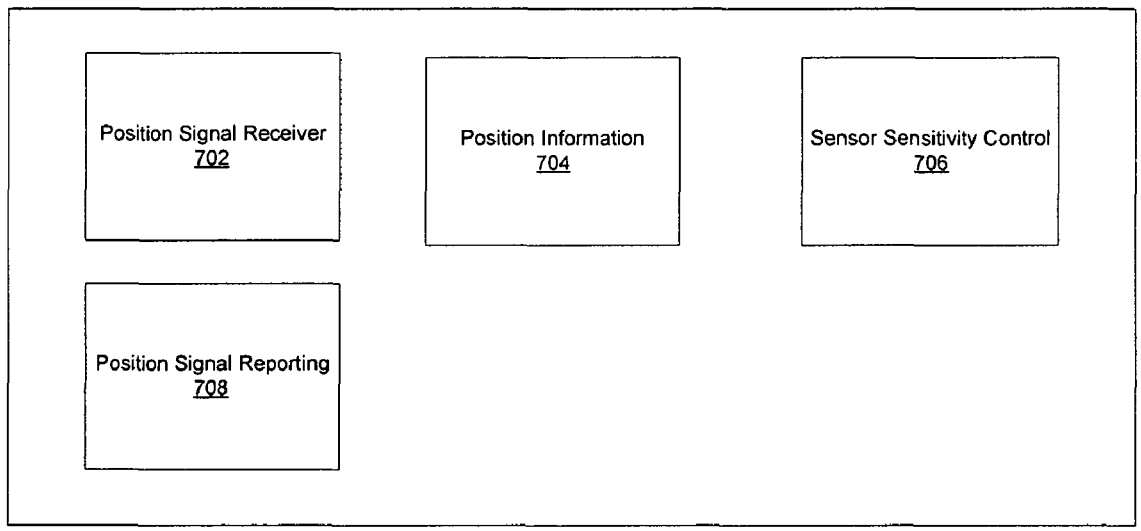
FIG. 7 shows a block diagram of a system for processing position information, in accordance with another embodiment of the present invention.

FIG. 7 illustrates example components used by various embodiments of the present invention. Although specific components are disclosed in system 700 it should be appreciated that such components are examples. That is, embodiments of the present invention are well suited to having various other components or variations of the components recited in system 700. It is appreciated that the components in system 700 may operate with other components than those presented, and that not all of the components of system 700 may be required to achieve the goals of system 700.

FIG. 7 shows a block diagram of a system for processing position information, in accordance with another embodiment of the present invention. System 700 may be coupled to an array of capacitive sensors comprising a plurality of sensor circuits as described herein.

Position signal receiver 702 receives position signals from an array of capacitive sensors. As described herein, the position signals may be received from one or more sensor circuits of an array of capacitive sensors. The position signals may further originate from multiple sensors comprising a centroid.

Position information module 704 accesses information corresponding with the position signal received by position signal receiver 702. The information may correspond with the position signal and include location information of a capacitive sensor within the array of capacitive sensors. For example, information regarding the relative location of a capacitive sensor relative to a connection (e.g., connections 104) of an array of capacitive sensors may be accessed. It is appreciated that values may be accessed as new position information is received from active sensors (e.g., as an object moves around).

The information may further include a scalar value for adjusting a position signal. The scalar value may be dependent on the sensor's distance from the detection logic and therefore based on the sensor's location within the array. In one embodiment, the value may be based on the percentage of reduction of the signal impacted by the impedance of the array as the signal is transmitted to a connection of a capacitive sensor array. For example, the scalar value may be used to increase a signal level by 50% of a capacitive sensor in the top left of a capacitive sensor in the array where the connections are in the bottom right. The scalar value may be based on the capacitive sensor's location resulting in a 50% reduction in the signal received at the connections of the array. It is appreciated that a scalar value corresponding to sensors adjacent to the connections of an array of capacitive sensors may not need to be applied.

In one embodiment, the scalar values may be stored in a matrix with each sensor circuit having a corresponding scalar value. For example, scalar values for adjusting position signals from sensor circuits remote from the connection of the array of capacitive sensors may be greater than the scalar values for sensor circuits near or adjacent to the connections of the array of capacitive sensors.

Scalar values corresponding to each sensor circuit may further facilitate more accurate readings from the array of capacitive sensors. For example, due to the impact of impedance on an array of capacitive sensors, centroid readings may be pulled down and to the right because the reading from sensors up and to the left are increasingly impacted by the series impedance of the array of capacitive sensors thereby having decreased sensitivity. The adjusting of centroid with the scalar values allows the centroid to be adjusted to compensate for the impact of the capacitance and thereby the centroid can be more accurately reported.

In another embodiment, all the sensor values may be adjusted by the same scalar value. For example, a scalar value may be multiplied or applied to each signal of each capacitive sensor in an array of capacitive sensors.

Sensor sensitivity control module 706 adjusts the sensitivity of one or more capacitive sensors. The sensor sensitivity control module 706 may adjust the sensitivity of one or more active capacitive sensors or a plurality of the capacitive sensors (e.g., including active and inactive sensors) in an array of capacitive sensors.

Sensor sensitivity control module 706 adjusts the sensitivity of one or more capacitive sensors by adjusting a scan time of the one or more capacitive sensors. The adjustment of the scan time of the capacitive sensors facilitates greater resolution and signal levels in readings from the capacitive sensors. The sensitivity may be adjusted according to the proximity of the sensors to the connections of the array of capacitive sensors. In one embodiment, the adjustment of the scan time increases the resolution and signals levels by increasing the detection period (e.g., phase 2 of circuit 200).

In one embodiment, a current source (e.g., current source 204) or capacitor (e.g., external modification capacitor 216) of a sensor circuit (e.g., circuit 200) may be adjusted to increase scan time. The adjustment of the current or capacitor value may result in increased counts or time measured by timer 210. For example, the current of a current source (e.g., current source 204) may be reduced which thereby increases the time before the reference voltage is reached and thereby increases the scan time.

In another embodiment, a pulse width modulator (e.g. pulse width modulator 510) may be adjusted to increase period of an output of a bit-stream of a circuit (e.g., circuit 500). The increased period of the output of the bit-stream enables higher raw counts or times to be measured thereby increasing the resolution of the sensor.

Sensor sensitivity control module 706 may further adjust the sensitivity of one or more capacitive sensors based on information corresponding to a location within the array of capacitive sensors including, but not limited to, scalar values accessed via position information module 704.

Position signal reporting module 708 reports the position signal. Position signal reporting module 708 may report a position signal after that has been adjusted by sensor sensitivity control module 706. For example, a first position signal may be received and a second signal may be reported after the sensitivity of the corresponding sensor has been adjusted by sensor sensitivity control module 706.

Example Operations

Figure 8:
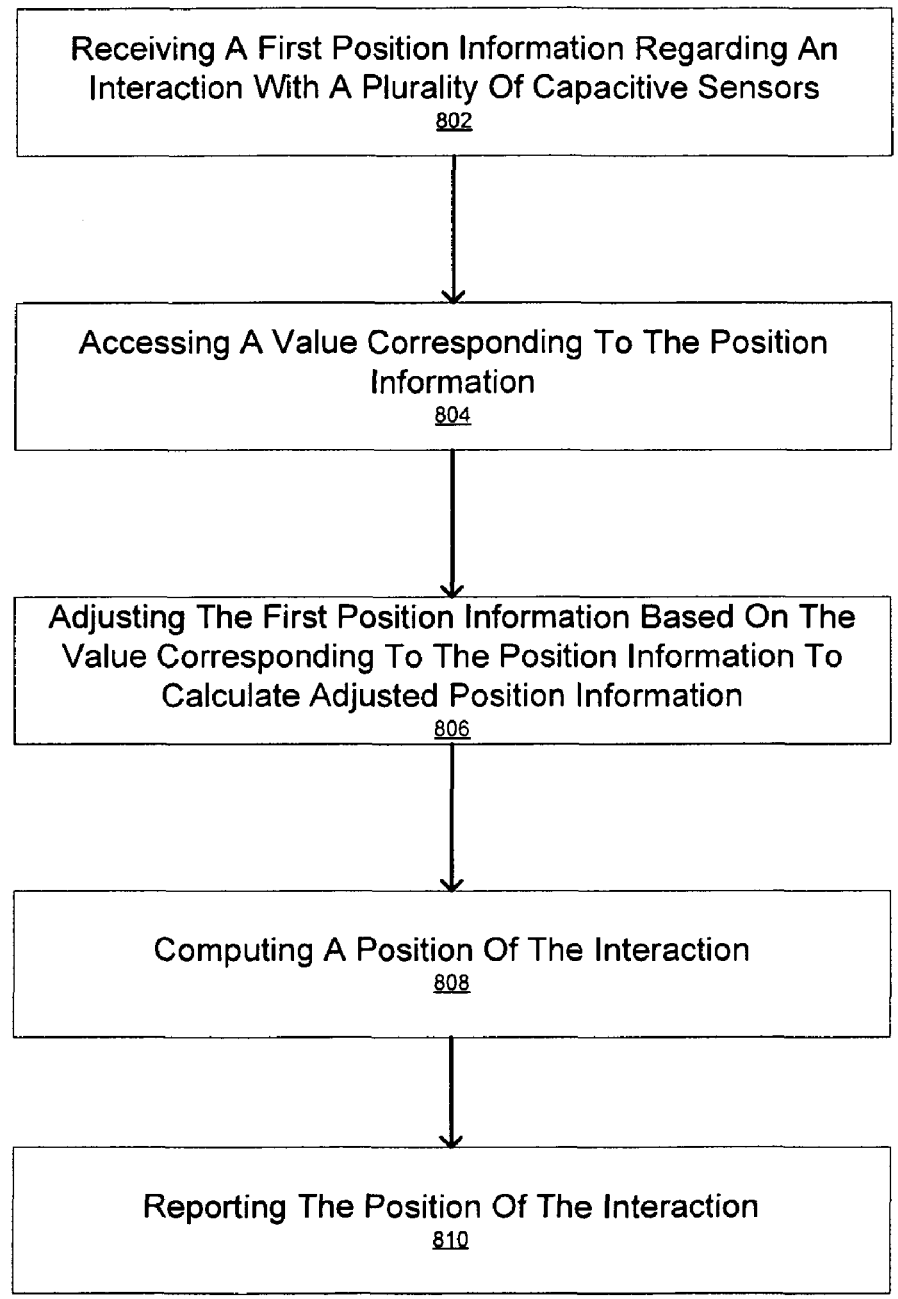
FIG. 8 shows a flowchart of an exemplary process for reporting position information, in accordance with an embodiment of the present invention.
Figure 9:
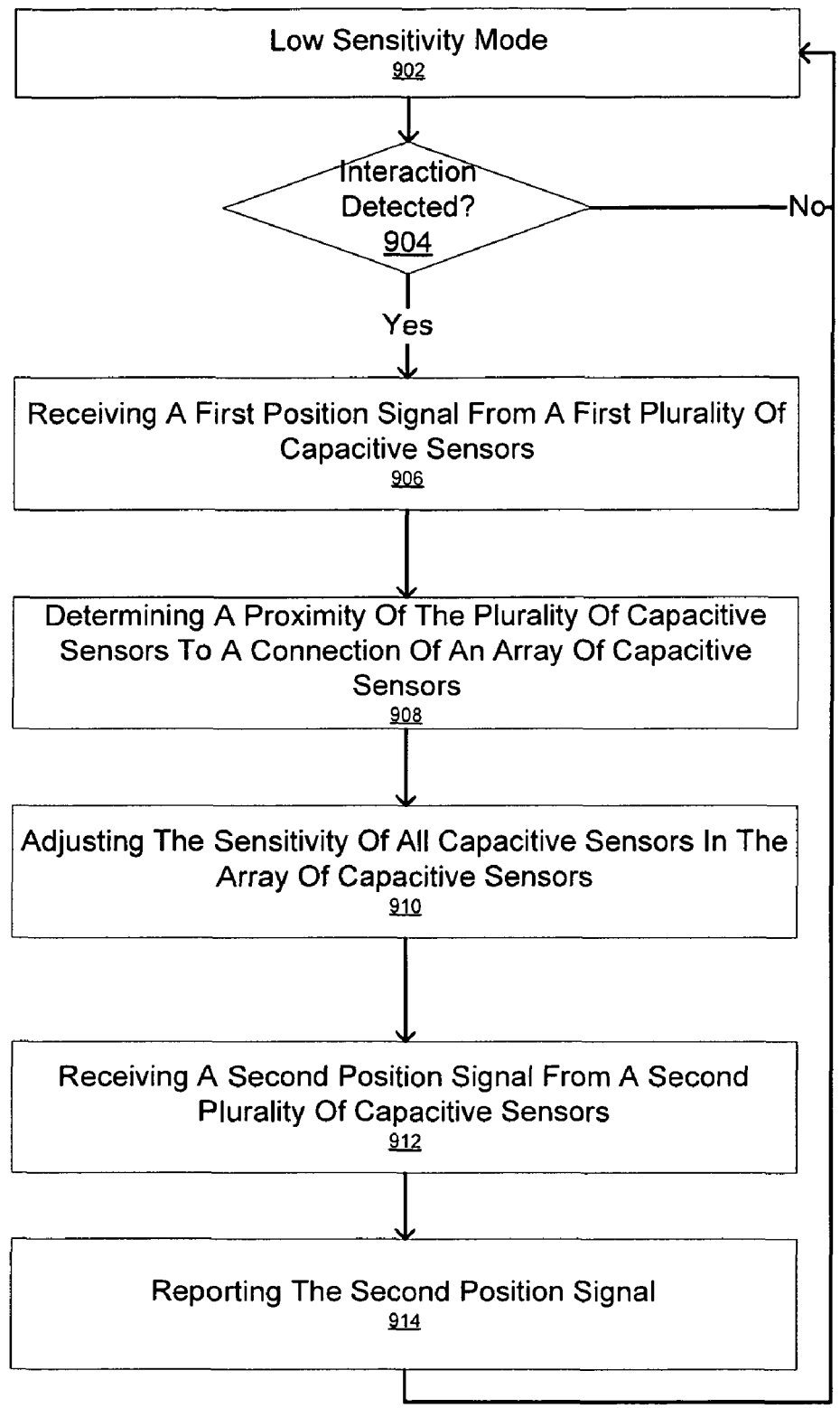
FIG. 9 shows a flowchart of an exemplary process for processing a position signal, in accordance with an embodiment of the present invention.
Figure 10:
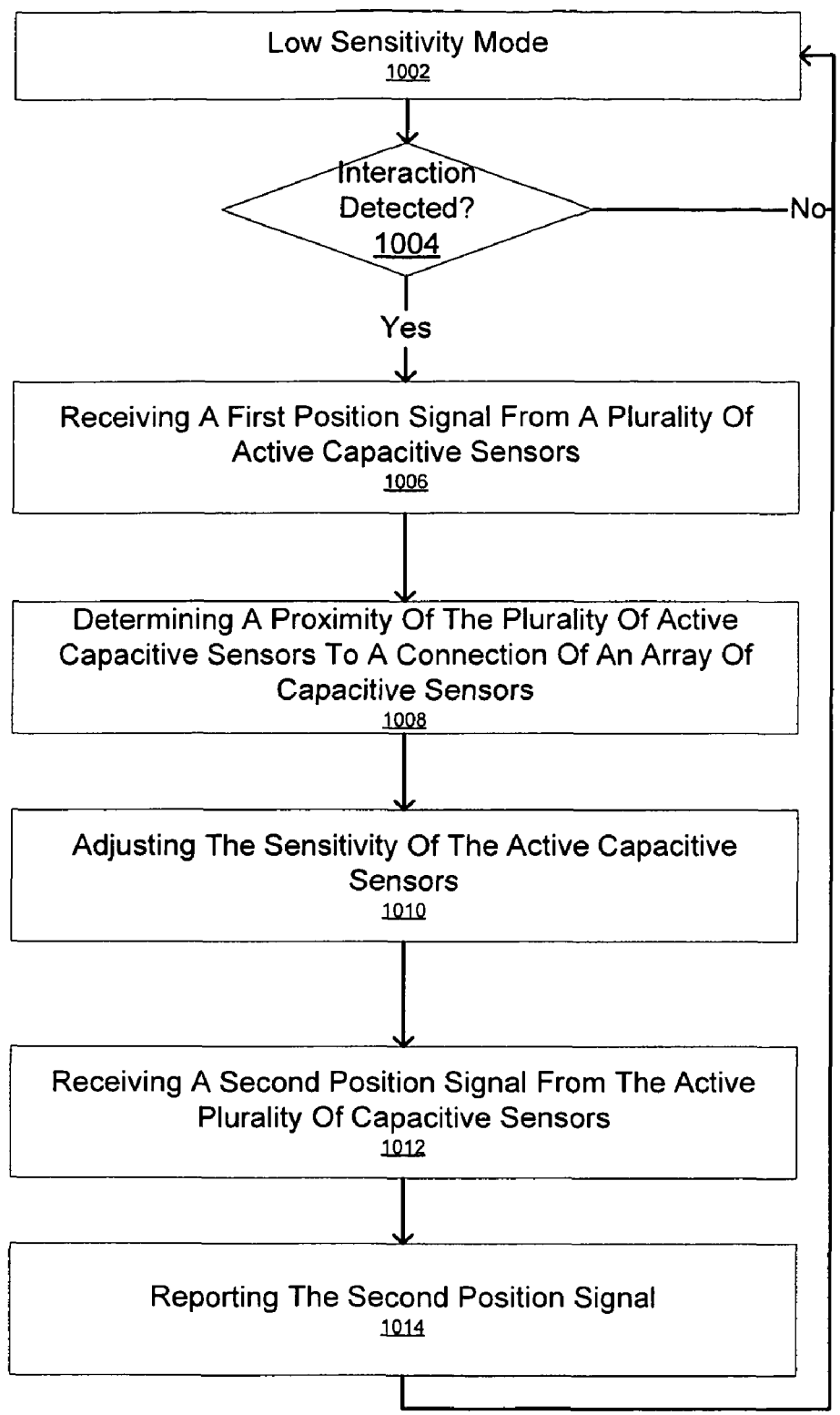
FIG. 10 shows a flowchart of an exemplary process for processing a position signal, in accordance with an embodiment of the present invention.

With reference to FIGS. 8-10, exemplary flowcharts 800-1000 each illustrate example blocks used by various embodiments of the present invention. Although specific blocks are disclosed in flowcharts 800-1000, such blocks are examples. That is, embodiments are well suited to performing various other blocks or variations of the blocks recited in flowcharts 800-1000. It is appreciated that the blocks in flowcharts 800-1000 may be performed in an order different than presented, and that not all of the blocks in flowcharts 800-1000 may be performed.

FIG. 8 shows a flowchart 800 of an exemplary process for reporting position information, in accordance with an embodiment of the present invention. The blocks of flowchart 800 may be performed by a data processing portion (e.g., data processing module 212 or data processing module 514) of a sensor circuit (e.g., sensor circuits 200 and 400-600).

At block 802, first position information regarding an interaction is received from a number of capacitive sensors. As described herein, the position information may include a centroid computation and may be received from one or more capacitive sensors in an array of capacitive sensors. Sensors reporting a signal that exceeds a threshold are active and contribute to the centroid computation.

At block 804, an adjustment value corresponding to the position information is accessed. As described herein, the adjustment value corresponding to the position information may be based on a location of the active capacitive sensor within an array of capacitive sensors relative to the connections of the array. For example, a larger adjustment value may correspond to sensors whose signal is impacted by the series impedance of the array of capacitive sensors as the signal travels to the connections of the array of capacitive sensors. In one embodiment, each capacitive sensor in the array may have a respective adjustment value assigned to it based on its relative distance to the detector logic. At step 804, the adjustment values are obtained for the active sensors participating in the centroid computation.

At block 806, the first position information is adjusted based on the adjustment values corresponding to the position information to calculate an adjusted position information. The adjusting may include multiplying the signals corresponding to the first position information with the adjustment values which may be scalar values. As described herein, the values may be applied to active sensors or one or more sensors of the array of capacitive sensors. It is appreciated that the adjustment of the position information may improve the signal level reported by sensor and thereby compensate for the impact of impedance on the array of capacitive sensors. In accordance with the embodiment described above, the sensor readings for the active sensors are multiplied by their respective adjustment values. This new data is then used to determine an adjusted position.

At block 808, a position of the interaction is computed using the adjusted signals. In one embodiment, the centroid is again calculated based on the adjusted position information.

At block 810, the position of the interaction as computed in 808 is reported. As described herein, the position of the interaction (e.g., centroid) may be reported to the device (e.g., computing device and the like) coupled to the array of capacitive sensors.

FIG. 9 shows a flowchart 900 of an exemplary process for processing a position signal, in accordance with another embodiment of the present invention. The blocks of flowchart 900 may be performed by a data processing portion (e.g., data processing module 212 or data processing module 514) of a sensor circuit (e.g., sensor circuits 200 and 400-600). It is appreciated that blocks or select blocks of flowchart 900 may be repeated as the position signal (e.g., centroid) moves around an array of capacitive sensors.

At block 902, the array of capacitive sensors is in a low sensitivity mode with all sensors scanned. In one embodiment, the array of capacitive sensors may operate in a low sensitivity mode while no interactions with the array are detected.

At block 904, whether an interaction with the array of capacitive sensors has occurred is detected. If there is no interaction detected, the capacitive sensor array remains in low sensitivity mode at block 902. If an interaction is detected, the capacitive sensor array may proceed to block 906.

At block 906, a first position signal is received from a first plurality of capacitive sensors. As described herein, the first position signal may be computed from a centroid and may be received from a plurality of capacitive sensors which are part of an array of capacitive sensors.

At block 908, a proximity of the plurality of capacitive sensors to a connection of an array of capacitive sensors is determined on an individual level. As described herein, the relative locations of one or more capacitive sensors to the connections of an array of capacitive sensors may be determined.

At block 910, the sensitivity of all capacitive sensors in the array of capacitive sensors is adjusted. The sensitivity of one or more capacitive sensors may be adjusted to increase the resolution and signal level, thereby compensating for the impact of the impedance of an array of capacitive sensors. Adjusting the sensitivity of all of the sensors allows enhanced tracking of an object as movement is detected.

The sensitivity of the capacitive sensors may be adjusted by adjusting the scan time of the capacitive sensors based individually on their location within the array. As described herein, the scan time of an individual sensor circuit may be adjusted by adjusting the current (e.g., lowering the current) for charging a capacitor of a current source (e.g., current source 204), adjusting a pulse width modulation (e.g., of pulse width modulator 410), a voltage threshold (e.g., reference voltage 226 or 422), or adjusting a capacitance of an integration capacitor (e.g., external modification capacitor 428). In one embodiment, the adjustment of the scan time increases the resolution and signals levels by increasing the detection period (e.g., phase 2 of circuit 200).

In one embodiment, the scan time may be adjusted according to the position of one or more capacitive sensors. For example, the scan time of sensors in the upper left could be increased more than the scan time in the middle of a capacitive sensor array where the connections of the array are in the lower right. In one embodiment, each sensor may have a respective adjustment factor that is based on its distance from the detecting logic.

At block 912, a second position signal is received from a second plurality of capacitive sensors. The second position signal may be received after the sensitivity of the sensors has been adjusted as described herein. It is appreciated that the second plurality of sensors may be different from the first plurality of sensors where the object has moved before the sensitivity of the sensors has been adjusted. The first plurality of sensors and the second plurality of sensors may be same when the object has not moved. At block 914, the second position signal is reported.

FIG. 10 shows a flowchart of an exemplary process for processing a position signal, in accordance with an embodiment of the present invention. The blocks of flowchart 1000 may be performed by a data processing portion (e.g., data processing module 212 or data processing module 514) of a sensor circuit (e.g., sensor circuits 200 and 400-600). It is appreciated that blocks or select blocks of flowchart 1000 may be repeated as the position signal (e.g., centroid) moves around an array of capacitive sensors.

At block 1002, the array of capacitive sensors is in a low sensitivity mode with all sensors scanned. In one embodiment, the array of capacitive sensors may operate in a low sensitivity mode while no interactions with the array are detected.

At block 1004, whether an interaction with the array of capacitive sensors has occurred is detected. If there is no interaction detected, the capacitive sensor array remains in low sensitivity mode at block 1002. If an interaction is detected, the capacitive sensor array may proceed to block 1006.

At block 1006, a first position signal is received from a plurality of active capacitive sensors. As described herein, the first position signal may be coupled from a centroid and may be received from a plurality of capacitive sensors which are part of an array of capacitive sensors.

At block 1008, a proximity of the plurality of active capacitive sensors to a connection of an array of capacitive sensors is determined. As described herein, the relative locations of one or more capacitive sensors to the connections of an array of capacitive sensors may be determined.

At block 1010, the sensitivity of the active capacitive sensors in the array of capacitive sensors is adjusted. The sensitivity of one or more capacitive sensors may be adjusted to increase the resolution and signal level, thereby compensating for the impact of the impedance of an array of capacitive sensors. Adjusting the sensitivity of the active capacitive sensors saves power over increasing the sensitivity of all the capacitive sensors.

The sensitivity of the capacitive sensors may be adjusted by adjusting the scan time of the capacitive sensors. As described herein, the scan time of an individual sensor circuit may be adjusted by adjusting the current (e.g., lowering the current) for charging a capacitor of a current source (e.g., current source 204), adjusting a pulse width modulation (e.g., of pulse width modulator 410), a voltage threshold (e.g., reference voltage 226 or 422), or adjusting a capacitance of an integration capacitor (e.g., external modification capacitor 428). In one embodiment, the adjustment of the scan time increases the resolution and signals levels by increasing the detection period (e.g., phase 2 of circuit 200). It is appreciated that adjusting the scan time of the active capacitive sensors saves scan time over increasing the scan time of the entire array of capacitive sensors.

In one embodiment, the scan time may be adjusted according to the position of one or more active capacitive sensors. For example, the scan time of sensors in the upper left could be increased more than the scan time in the middle of a capacitive sensor array where the connections of the array are in the lower right. In one embodiment, each sensor may have a respective adjustment factor that is based on its distance from the detecting logic.

At block 1012, a second position signal is received from the plurality of active capacitive sensors with heightened sensitivity. The second position signal may be received after the sensitivity of the sensors has been adjusted as described herein. At block 1014, the second position signal is reported.

Thus, embodiments of the present invention compensate for the impedance of an array of capacitive sensors. Thus, a substantial improvement in accuracy and performance of arrays of capacitive sensors is achieved.

Embodiments of the present invention are thus described. While the present invention has been described in particular embodiments, it should be appreciated that the present invention should not be construed as limited by such embodiments, but rather construed according to the below claims.

What is claimed is:

1. A method for reporting position information, the method comprising:
    receiving position information regarding an interaction with a capacitive array, said position information originating from active sensors of said capacitive array;
    accessing respective adjustment values corresponding to said active sensors, the respective adjustment values derived from the position information;
    adjusting said position information based on said respective adjustment values corresponding to said active sensors to produce adjusted position information;
    determining a position of said interaction based on said adjusted position information; and
    reporting said position of said interaction.

2. The method of claim 1, wherein said respective adjustment values corresponding to said active sensors further are based on locations of said active sensors within said capacitive array.

3. The method of claim 1, wherein said adjusting comprises multiplying said position information said respective adjustment values.

4. The method of claim 1, wherein said position information comprises output values for said active sensors.

5. The method of claim 1, wherein said determining a position of said interaction comprises computing a centroid computation based on said adjusted position information.

6. The method of claim 1, wherein said sensor array comprises a high impedance substrate.

7. A system for processing position information, the system comprising:
- a position signal receiver for receiving a first position signal from a capacitive sensor array;
- a position information module for accessing sensitivity information corresponding to and derived from said first position signal;
- a sensor sensitivity control module for adjusting the sensitivity of capacitance sensors within said capacitive sensor array corresponding to said sensitivity information; and
- a position signal reporting module for determining a second position signal based on said capacitor sensor array with adjusted sensitivity.

8. The system of claim 7, wherein said sensitivity information corresponding with said first position signal comprises location information of active capacitive sensors within said capacitive sensor array.

9. The system of claim 7, wherein said position information module accesses a value for adjusting a sensitivity of a capacitive sensor.

10. The system of claim 7, wherein said sensor sensitivity control module adjusts the sensitivity of one or more active capacitive sensors.

11. The system of claim 7, wherein said sensor sensitivity control module adjusts the sensitivity of a plurality of sensors within said capacitive sensor array.

12. The system of claim 7, wherein said sensor sensitivity control module adjusts the sensitivity of one or more capacitive sensors by adjusting a scan time of said one or more capacitive sensors.

13. The system of claim 7, wherein said sensor sensitivity module adjusts the sensitivity of one or more capacitive sensors based on locations of said one or more capacitive sensors within said array of capacitive sensors.

14. A method for processing a position signal, the method comprising:
- receiving a first position signal from a capacitive sensor of an array of capacitive sensors;
- determining a proximity of a contact object to said capacitive sensor of an array of capacitive sensors;
- adjusting a sensitivity of said capacitive sensor based on said proximity;
- receiving a second position signal from said capacitive sensor having its sensitivity adjusted; and
- reporting said second position signal.

15. The method of claim 14, wherein said adjusting of said sensitivity of said capacitive sensor comprises adjusting a scan time of said capacitive sensor.

16. The method of claim 14, wherein said adjusting of said sensitivity of said capacitive sensor comprises adjusting a current for charging a capacitor.

17. The method of claim 14, wherein said adjusting of said sensitivity of said capacitive sensor comprises adjusting a capacitance of a modification capacitor.

18. The method of claim 14, wherein said adjusting of said sensitivity of said capacitive sensor comprises adjusting a voltage threshold.

19. A method for processing a position signal, the method comprising:
- receiving first position signals from a plurality of active capacitive sensors;
- determining individual proximities of said plurality of active capacitive sensors to at least one contact object;
- adjusting sensitivities of the active capacitive sensors based on said individual proximities;
- receiving second position signals from said plurality of active capacitive sensors having their sensitivity adjusted; and
- reporting said second position signals.

20. The method of claim 19, wherein said adjusting comprise individually adjusting scan times of said plurality of active capacitive sensors.

21. The method of claim 19, wherein said adjusting is based on said individual proximities of said plurality of active capacitive sensors.

* * * * *